Figure 1:
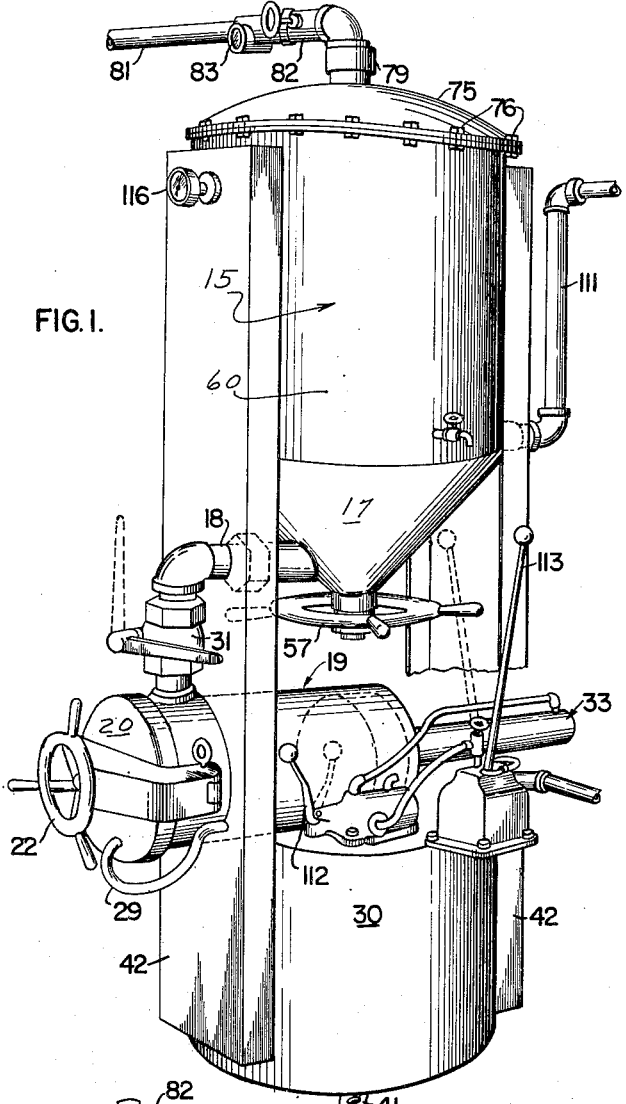

Sept. 25, 1962 K. S. ARVANITAKIS 3,055,290
FILTER SYSTEM

Filed May 19, 1960 3 Sheets-Sheet 1

INVENTOR
Kostas S. Arvanitakis

BY *Wynne; Finken*
ATTORNEYS.

Sept. 25, 1962 K. S. ARVANITAKIS 3,055,290
FILTER SYSTEM
Filed May 19, 1960 3 Sheets-Sheet 2

INVENTOR
Kostas S. Arvanitakis
BY
Wynne & Finken
ATTORNEYS.

Sept. 25, 1962 K. S. ARVANITAKIS 3,055,290
FILTER SYSTEM
Filed May 19, 1960 3 Sheets-Sheet 3

INVENTOR.
Kostas S. Arvanitakis
BY
Wynne & Finken
ATTORNEYS.

United States Patent Office
3,055,290
Patented Sept. 25, 1962

3,055,290
FILTER SYSTEM
Kostas S. Arvanitakis, Farrell, Pa., assignor to Arvan Products, Inc., Brooklyn, N.Y., a corporation of Pennsylvania
Filed May 19, 1960, Ser. No. 30,197
5 Claims. (Cl. 100—116)

My invention relates to a filter. More specifically, my invention relates to a process and apparatus for reclaiming dry cleaning fluid from the filter cake. Filter units in use today utilize steam for cooking muck to reclaim valuable fluid. Steam reclaiming systems are expensive. Other attendant disadvantages are the production of distasteful odors and messy work conditions which adversely affect the employees.

In the instant invention compact apparatus is provided which requires no steam and also which requires less space and operating expenditure while producing improved fluid reclamation. Maintenance expenditures for the apparatus is importantly reduced; complications due to heat and steam are eliminated; and since no scraping action is required for the removal of filter cake from the cylindrical units, the filter tubes have a longer life.

Of major importance is the fact that the filter unit can be conditioned with new cake each day without the requirement of back-washing which, over a period, builds up lint and dirt at the internal surface or downstream side of the filter screens. As previously mentioned, the elimination of the requirement for scraping prevents the building up of foreign matter at the external or upstream face of the screen; a scraper trowels the muck and causes firm adhesion thereof to the filter screen.

The system comprises the forming of a cake of diatomaceous earth particles on filter screen elements which are cylindrical in form, there being a plurality of such elements depending from the filter plate. Dirt containing used fluid is forced through the filter elements, the dirt being deposited on the cake. At the end of a day's operation the filter screen elements are rotated or oscillated in a body of the fluid to wash and dislodge the contaminated cake from the filter cylinders. The cake is then allowed to pass downwardly to a compression zone where it is eventually compressed to force fluid therefrom for return to the system, the resultant cake being discharged as a dry, compressed cake unit. New diatomaceous earth is added to the cleaning fluid to form another cake on the filter tubes.

The apparatus is uniquely designed to provide a compact vertical unit which may be installed in a small space next to or removed from the washer. The required fluid storage tank, muck compressor and fluid filtering tank are arranged vertically one above the other with diametrically opposed pillars supporting the fluid filtering tank from the storage tank. The side supporting pillars leave access spaces for operation of the muck compressor to reclaim dry cleaning fluid as well as access to the hand wheel for oscillating the filter tubes. Four fluid sealing means are provided which enable dismantling the unit as well as enabling rotation of the filter tube assembly within the filter tank. These four seals are uniquely combined with the structure to reduce maintenance and increase structural integrity.

The dirty used filter fluid is delivered horizontally and then upwardly through the center of the filter tank unit as a stream annular in cross section. The annular stream is directed against the under surface of the filter tube plate from whence the fluid circulates downwardly for flow through the filter screen tubes. The upper surface of the horizontal portion of the inlet pipe is effectively washed clean by circulation of filter fluid and also upon withdrawal of muck during the filter fluid reclaiming operation.

Another important feature of my invention is the provision of a fluid inlet trap at the inlet to the filter storage tank which eliminates the need for a shut-off valve and a check valve in the line from the solvent pump. When the filtering tank is cleaned the fluid is allowed to drain to a predetermined level as set by the inlet trap and fluid is then sprayed upwardly from the outlet of the inlet pipe into washing engagement with the bottom surface of the filter tube plate. This action inhibits bridging of the cake.

Figures 2, 10:
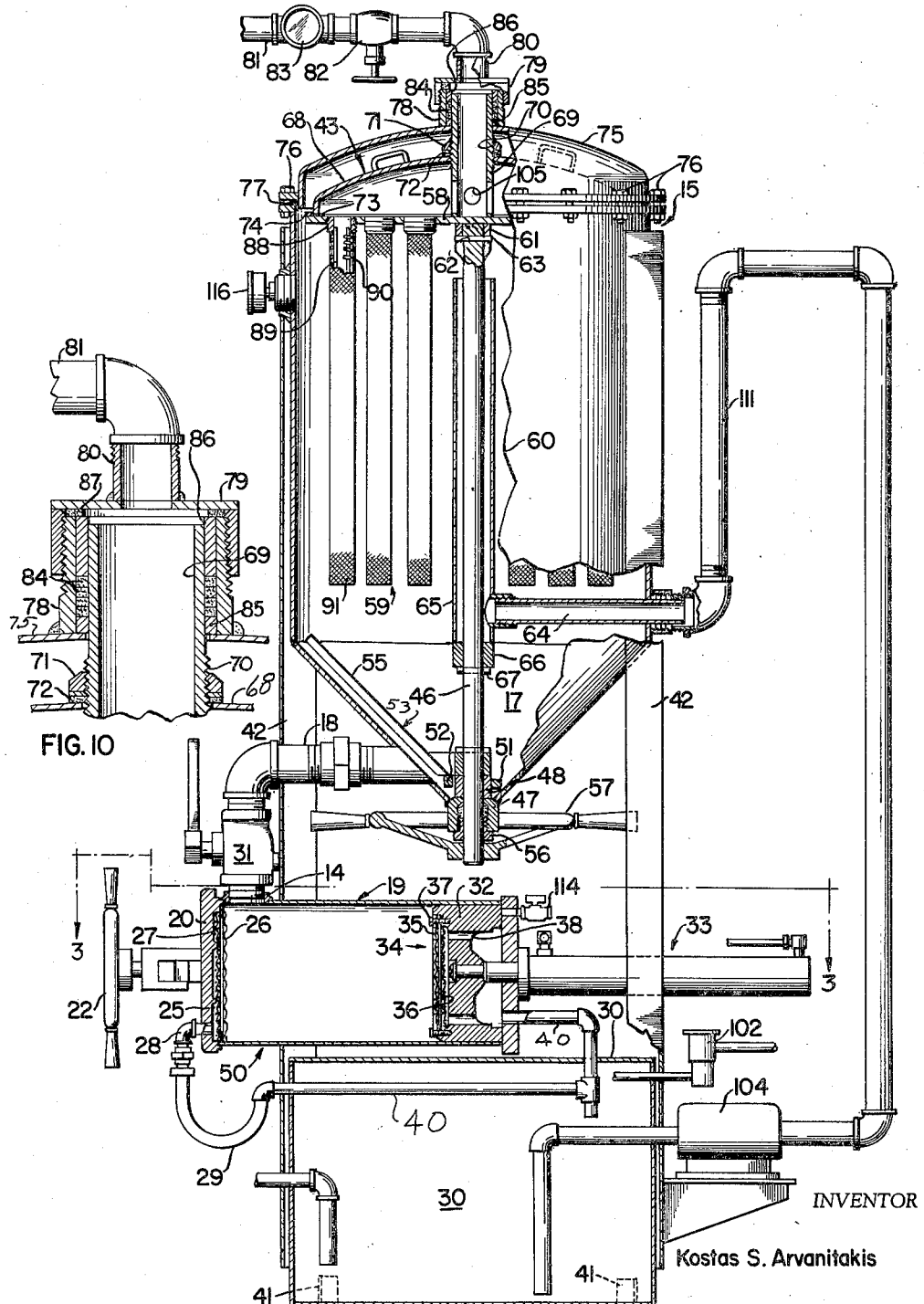
Figures 3, 4:
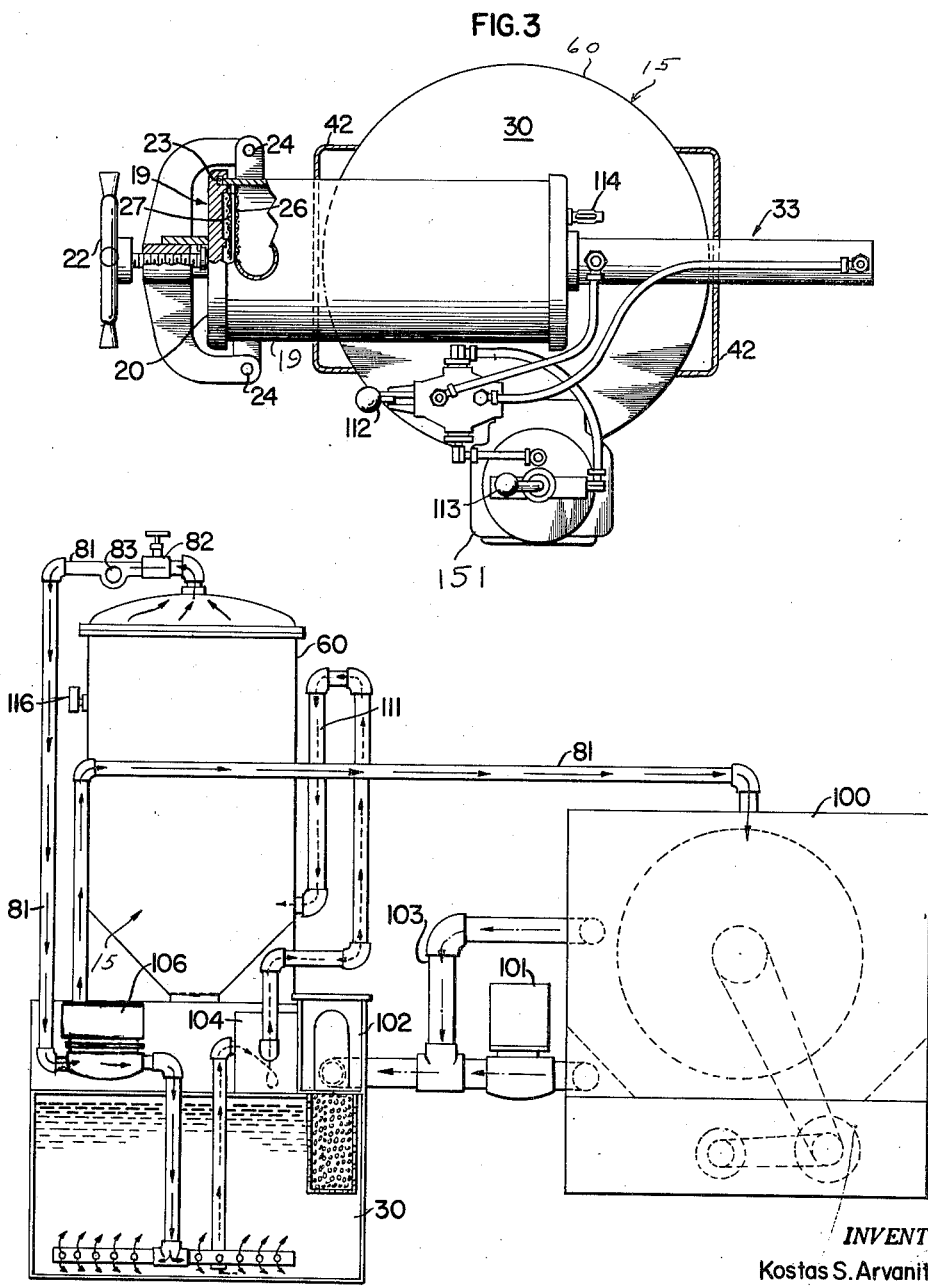

Other important objects and advantageous features of my invention will be apparent from the following description and accompanying drawings, wherein, for the purposes of illustration herein, a specific embodiment of this invention is set forth in detail, and wherein:

FIGURE 1 is a perspective view of my invention;
FIGURE 2 is an elevational view partly in section of the filter mechanism shown in FIGURE 1;
FIGURE 3 is a top sectional view taken on line 3—3 of FIGURE 2;
FIGURE 4 is a schematic view showing the filter mechanism connected with a washer;
FIGURES 5–9 are schematic views showing the operation of the filter mechanism and the reclamation of dry cleaning solvent; and
FIGURE 10 is an enlarged sectional view showing the sealing arrangement of the inner and outer dome sections.

Referring now to FIGS. 1–3 it will be seen that my invention comprises the fluid filtering tank generally indicated by numeral 15 which has a vertical cylindrical side wall 60. A muck collecting cone 17 is connected to and depends from the bottom of the cylinder 60. Extending horizontally outwardly from cone 17 is a discharge conduit 18 which includes a vertical leg in fluid communication with the inlet 14 of an elongated cylinder 19 which defines an elongated muck compressor 50. The cylinder 19 is suitably supported by a bottom fluid storage tank 30. The cylinder 19 has a hatch or door 20 hingedly mounted at the outlet of the compression zone; a locking whel 22 maintains the door 20 in closed position. The discharge conduit 18 has a hand operated drain valve 31 mounted therein which controls flow to the compression zone.

The discharge end of cylinder 19 is closed by the door 20 which is designed for the application of axial force to accomplish smooth fluid tight sealing through gasket 23 (FIG. 3) on the edge of the cylinder 19. The door is mounted on I-bolts 24 at opposite horizontal sides of the cylinder and when one of the I-bolts is removed, the door can be swung to an open position using the other I-bolt and its holder as a hinge. The door is of the type which enables the application of axial force to the door to accomplish complete sealing. The inner face of the door 20 is under-cut or hollowed out to provide a discharge zone or conduit 25 for fluid squeezed or flowing from the muck. A Monel filter screen 26 (28 x 28) is mounted at the inner face of the door 20 with a larger opening type backing screen 27 of more substantial nature mounted between the door and the Monel filter screen 26 to back up or reinforce the Monel filter screen. The reclaimed fluid conduit means includes conduit 25 in the door 20, an axially extending conduit or pipe 28 having a flexible hose 29 to allow door operation, and piping 40 to the fluid storage tank.

A piston 32 is reciprocably mounted in cylinder 19 and is moved through its horizontal path by means of a hydraulically operated piston means 33 mounted in the hydraulic cylinder 19. The muck contacting face 34 of the compression piston 32 includes a Monel screen 35

(26 x 26) for filtering fluid and a back-up or reinforcement screen 36 combination similar to that on the door 20 as previously described. It will be noted that screws 37 hold the screens 35, 36 in position at the face of the piston; the same arrangement is used at the inside face of the door. The compression piston has a discharge bore 38 from its face to its rearward portion which conducts fluids squeezed or flowing from the muck to the rearward end of the cylinder. The reclaimed fluid flows out of the rearward end of the cylinder 19 into discharge drain line 40 for delivery to the storage tank 30.

It will be noted that the storage tank 30 is supported by three feet 41 welded thereto and further that two side support plates or pillars 42 extend upwardly from the storage tank and are welded thereto at their lower ends. These support plates 42 extend upwardly past the muck compressor 50 and have their upper ends welded to the outer side wall 60 of the fluid filtering tank 15. This design provides supporting means for the fluid filtering tank 15 and elements disposed therein.

A filter tube support and tank cleaning assembly 43 is supported and rotatably mounted within the filtering tank 15 by means of a central drive shaft 46 which passes upwardly through a thrust bearing 47 and which has a bearing flange 48 affixed thereto which seats upon the bearing 47. Bearing faces are preferably chrome plated to reduce friction. It will be noted that the thrust bearing 47 is welded to the bottom apex of the cone 17 and presents an upper face which is chrome plated on which rests the bearing flange 48 which is, in turn, welded to the drive shaft 46. The bearing flange 48 has a lug 51 welded at one side portion thereof so that upon rotation of about 360° it will engage a downwardly extending dog 52 on the scraper 53 which is in turn freely mounted for rotation on the shaft 46. The scraper 53 includes a scraper blade 55 which extends in spaced relation upwardly along the side wall of the cone 17 and which, upon rotation, scrapes muck around the cone for ultimate flow to the discharge conduit 18. A gasket housing is provided in the thrust bearing and a packing gland 56 is threadedly received in the housing for adjustment of the seal at this point.

The lower end of the shaft 46 is equipped with a hand wheel 57 which enables manual rotation and oscillation of the shaft which in turn causes desired movement of the filter support and tank cleaning assembly 43. The upper end of the drive shaft 46 supports the circular filter tube plate 58 to which are removably attached a plurality of filter tubes 59, the filter tubes 59 extending downwardly from the plate 58 and terminating just above the bottom of the cylindrical wall 60 of the tank.

The central collar 61 depending from the tube plate 58 has an open ended transverse slot 62 which receives a pin 63 mounted in and passing through the upper end of the shaft 46. The plate 58 rests on the top surface of the shaft 46 with the pin 63 engaging the vertical walls of the slot 62 for transmitting rotational movement of the shaft to the plate.

A used solvent inlet pipe 64 is provided just above the cone 17 of the tank 15 and extends horizontally inwardly to a vertical inlet pipe 65 which extends upwardly and concentrically around the drive shaft 46 to the upper portion of the tank. A collar bearing 66 is fixedly mounted at the lower end of the vertical inlet pipe 65 and below the horizontal inlet pipe to provide a seal between the shaft 46 and the inlet pipe means. In practice it has been found that a clearance of .003 inch is suitable for restricting flow between the surface of the shaft and the inner wall of the bearing; in effect the total clearance between the bearing and the shaft being at a maximum 0.006 inch. A removable pin 67 extending through shaft 46 provides a seat for the collar bearing 66. The vertical inlet pipe 65 and the horizontal inlet pipe 64 are therefore structurally supported by the tank wall 60 and the bearing support pin 67. Used solvent fluid entering the tank is therefore conducted horizontally to the center of the tank and then upwardly for a spraying type delivery to the inside of the tank at the upper portion thereof.

Used or dirty fluid enters the inlet pipe and is delivered into the tank as described. The fluid then passes through the tubes 59 and then upwardly through the inside of the tube into the upper portion of the filter support and tank cleaning assembly 43. As seen in FIG. 2 a cap or inner dome 68 encloses a chamber above the top discharge ends of filter tubes 59, the inner dome 68 being sealed to the peripheral portion of the circular tube plate 58. The central portion of the inner dome 68 has a central opening therethrough.

Welded to and extending upwardly from the top surface of the filter tube plate 58 is an outlet neck 69 which passes through the inner dome opening and then through the outer dome opening. This outlet neck 69 has four holes therein communicating with the rejuvenated fluid chamber formed by the inner dome 68 and the filter tube plate 58 so that the rejuvenated fluid may pass from the chamber into the outlet neck 69 for ultimate flow out of the filter system. The middle portion of the neck 69 has threads 70 which receive a lock nut 71 (FIG. 10), a washer and gasket 72 thereunder which is in turn pressed into engagement with the inner peripheral edge of the central opening of the inner dome 68 to provide a fluid-tight seal at this point. The lock nut 71 also forces the outer bottom periphery of the inner dome 68 downwardly into engagement with a gasket 73 at the outer peripheral top surface of the filter tube plate 58. An annular ring 74 is provided outwardly of the bottom edge of the inner dome 68 to maintain the proper sealing position of the gasket. In the embodiment shown, this ring 74 is welded to the outer peripheral edge of the tube plate 58.

The outer dome 75 of the filtering tank 15 is connected to the top of the cylindrical wall 60 of the tank by a series of spaced peripheral bolts 76 which press a gasket 77 between the flanges of the outer dome of the tank and the flanges on the cylindrical wall.

A central opening is provided in the outer dome 75 through which the outlet neck 69 extends. A packing retaining ring 78 is welded to the outer dome 75 of the tank around this opening, this retaining ring 78 being externally threaded to receive an internally threaded cap 79 which has a suitable pipe nipple fitting 80 for receipt of discharge conduit for return of rejuvenated fluid to the system. Conduit 81 has a valve 82 and a sight glass 83. A plurality of ¼ inch square African blue asbestos packing braids 84 is inserted into the space between the outlet neck or shaft 69 and the packing retaining ring 78. A brass washer 85 seats on the inner peripheral edge of the outer dome 75 and acts as a seat for the braids 84. Above the packing elements is placed a compression ring 86 which is positioned between the retaining ring 78 and the outlet neck 69. By screwing the cap 79 downwardly, the compression ring 86 forces the packing braids 84 downwardly and outwardly into sealing engagement. The amount of compression of the packing is preferably regulated by a gasket 87 positioned between the cap 79 and the compression ring, the dimension of this gasket being predetermined to accomplish predetermined compression of the packing braids so that a suitable seal is provided without restricting or preventing the required rotation of the outlet neck 69. The seal means thus described serves a number of purposes: (1) prevents leakage of used as well as rejuvenated solvent fluid; (2) facilitates disassembly and assembly; (3) provides a bearing for the outlet neck or shaft 69 to insure rotational axial alignment of the filter tube support and tank cleaning assembly 43.

It will be noted in FIGURE 2 that each filter unit 59 includes an externally threaded annular member 88 which provides a rejuvenated fluid discharge hole from the unit.

Four elongated pins 89 are affixed in equally spaced holes in the annular member 88 and extend axially downwardly therefrom. The lower ends of the pins 89 are bent inwardly and united. A helical spring 90 is then mounted around the outer periphery of the four pins 89 and then a 60 x 55 Monel screen 91 is silver soldered to the entire unit including the bottom of the annular member 88. The Monel screen 91 is formed in the shape of a round tube with a screen bottom end so that all fluid is forced to pass through the screen tube and the screen bottom end, the upper end being silver soldered as described.

Referring now to FIGURE 4, it will be seen by the flow diagram that the basic apparatus of the dry cleaning system includes a wsher 100 into which clothing and the like are placed. The washer is provided with dry cleaning solvent fluid which removes soil and dirt from the clothing. The fluid flows through valve 101 to a button trap 102, an overflow line 103 being provided in parallel to prevent flooding. The fluid drains from the button trap 102 into the storage tank 30. A solvent fluid pump 104 draws fluid from tank 30 and forces it into the filter tank 15 at a pressure of about 10 p.s.i.g. Preferably the fluid passes through the storage tank 30 prior to upward movement into the filter tank 15. The fluid is delivered upwardly against plate 58 and then passes through the screens of the filter tubes 59 and then flows upwardly through the tubes 59 into the chamber above plate 58, through the openings 105 in neck or shaft 69 and into the discharge conduit 81 where it passes by the sight glass 83, the discharge conduit 81 continuing back to the washer 100. A valve 106 is provided in the discharge conduit 81 to stop flow of solvent to the washer 100 and divert this flow to the storage tank 30.

It will be noted that used solvent from the washer 100 is delivered to the fluid filtering tank 15 through an inlet trap 111 which connects with pipe 64. This inlet trap 111 eliminates the need for valves and on draining aids in establishing the desired level to facilitate spray washing of the tubes 59 and plate 58.

The filter inlet trap 111 and pipe 64 should be about one pipe size smaller than the filter outlet system 69, 80 and 81. If inlet is ¾ inch pipe, then outlet should be 1 inch pipe. The filter line 81 to the washer 100 should not be smaller in size than the outlet system.

*To Precoat and Put Fliter Into Operation*

(1) Open filter outlet valve 82.
(2) Open muck drain valve 31.
(3) Add diatomaceous earth (about 3–6 pounds) at button trap 102, washer 100 or other suitable point as close as possible to the solvent pump 104 suction line.
(4) Turn on solvent pump 104.
(5) Make sure solvent is going into washer 100 and overflowing in pipe 103.
(6) Allow solvent to circulate until solvent appears clear in sight glass 83 in the filter discharge line.
(7) Activated carbon should then be added in quantities as per manufacturers' recommendations.
(8) Circulate solvent for 5 to 10 minutes.

In a high-volume plant, to maintain greater porosity of filter surface, diatomaceous earth (pre-coat powder) should be added in the washer 100 with each load of clothes to be cleaned.

| Weight of clothes (loads), lbs.: | Recommended amount of pre-coat powder (per load), oz.: |
|---|---|
| 15–25 | 4 |
| 25–50 | 8 |
| 50–80 | 12 |
| 80–120 | 16 |

*Daily Filter Cleaning (De-Mucking and Strofing)*

(1) At end of every day's operation turn off solvent pump 104.
(2) Allow solvent to drain down to level established by inlet trap 111 (this takes about 3 minutes).
(3) Close filter outlet valve 82.
(4) Move directional valve lever 112 to proper back position for moving compressor piston 32 to back position.
(5) Operate hydraulic pump 151 until resistance is felt on hydraulic pump handle 113. Piston 32 is then in back position permitting muck to enter the reclaim cylinder 19.
(6) Check vent valve 114 located top rear of reclaim cylinder 19. Should be closed.
(7) Tightly close door 20.
(8) Open muck drain valve 31.
(9) Turn on solvent pump 104 to spray wash apparatus.
(10) Rotate strofing wheel 57 while muck is draining into reclaim cylinder 19. Rotate completely around and back and forth 5–6 times. Allow muck to drain and solvent to circulate for 5 minutes.
(11) Turn off solvent pump 104.
(12) Allow pressure gauge 116 to drop to zero.
(13) Close muck drain valve 31.
(14) Open filter outlet valve 82.
(15) Open reclaim cylinder vent valve 114.

*To Compress Muck Into Hard Dry Block*

In the morning after the filter tubes are precoated as previously described and the dry cleaning operation has been started, the muck can be compressed into a hard dry block.

(1) Check vent valve 114 should be open.
(2) Pull directional valve lever 112.
(3) Operate hydraulic hand pump 151 until resistance is felt on handle 113. Then pump 5 or 6 times more.
(4) Push directional valve lever 112 to relieve pressure. Let stand 15–20 minutes. Repeat No. 2 and No. 3 steps 5–6 times or until solvent stops draining through reclaim cylinder drain or discharge line 40.
(5) At end of step No. 4 push directional valve lever 112 to back position. Wait 2–3 minutes.
(6) Place container under reclaim cylinder door 20.
(7) Open reclaim cylinder door 20.
(8) Pull directional valve lever 112 forward.
(9) Operate hydraulic hand pump 151 until block drops into container.
(10) Push directional valve lever 112 back and operate hydraulic hand pump 151 until resistance is felt on handle. Piston 32 has now returned to the back of the reclaim cylinder.
(11) Close door 20 securely.
(12) Close reclaim cylinder vent valve 114.

In summary, therefore, my invention provides a unique system wherein normal dry cleaning procedures may be followed without interruptions and dry cleaning fluid or solvent can be efficiently recovered from muck without the usual muck handling problems.

Figure 5:
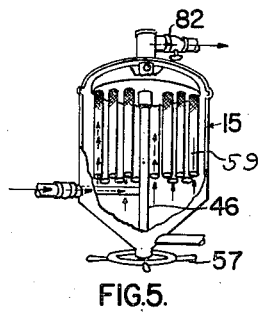
Figure 6:
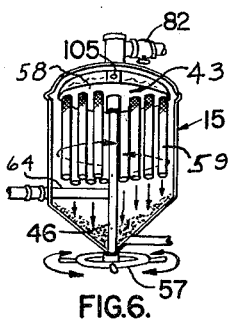
Figures 7, 8:
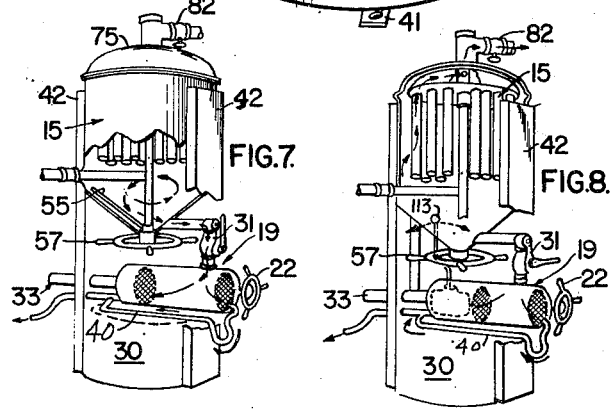
Figure 9:
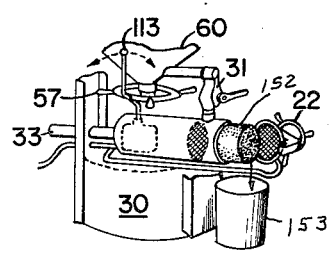

The system is schematically shown in FIGS. 5–9. FIG. 5 shows the normal operation of the filter during the dry cleaning operation wherein the dirt collects on the outer surface of the pre-coated filter tubes 59. FIG. 6 shows the operation whereby the filter tube support and tank cleaning assembly 43 is oscillated by the hand wheel 57 to wash the soil containing pre-coat off the filter tubes 59. In this stage fluid is pumped into the tank 15 and sprayed upwardly against the under surface of plate 58, the liquid level being below the plate 58 and effectively maintained at this lower level by the inlet trap 111. It will be recognized also that the agitation of the fluid due to oscillation of the tubes 59 accomplishes cleaning of the upper surface of used solvent inlet pipe 64. FIG. 7 shows muck drain valve 31 opened thereby allowing the settled muck to flow from the tank 15 into the cylinder 19, the piston 32 being in a withdrawn position. FIG. 8 shows valve 31 closed with the muck in a compressed condition accomplished by actuation of the hydraulic pump handle 113.

After solvent has been allowed to drain from the compressed muck for a proper period of time through the discharge line 40, the handle 22 on the door of the cylinder 19 is operated to open the cylinder and allow discharge of the hard, dry, firm cake slug 152 into a suitable container 153. It will be recognized that the muck handling problem has been most effectively simplified.

Various modifications of this invention will be apparent to those skilled in the art and, for that reason, I wish to limit myself only within the scope of the appended claims.

I claim:

1. In a cake-type filter apparatus, a fluid filtering tank having a cylindrical outer wall, an upper portion, and a cone depending therefrom having an axial thrust bearing at its bottom apex portion, an outer dome removably connected to the top of said wall and having a central outlet neck, first fluid seal means between said wall and dome, a drive shaft seated on said thrust bearing and extending from outside said cone axially upwardly through said bearing to the level of the upper portion of said wall, second fluid seal means between said drive shaft and said bearing, a filter tube means having a horizontal circular plate with openings and with a central depending socket seated on the top end of said shaft and locked therewith for rotational movement, filter tubes removably mounted in said openings, a central pipe shaft affixed to and extending axially upwardly from the top surface of said plate through said outlet neck, an inner dome seated at the peripheral edge of said plate and having a central axial opening surrounding said pipe shaft, third fluid sealing means between said inner dome and the plate edge, and fourth fluid sealing means between said inner dome and said pipe shaft.

2. In a cake-type filter apparatus, a fluid filtering tank having a cylindrical outer wall, an upper portion, and a cone depending therefrom having an axial thrust bearing at its apex portion, an outer dome removably connected to the top of said wall and having a central outlet neck, first fluid sealing means between said wall and dome, a drive shaft seated on said thrust bearing and extending from outside said cone axially upwardly through said bearing to the level of the upper portion of said wall, second fluid sealing means between said drive shaft and said bearing, a filter tube means having a horizontal circular plate with openings and with a central depending socket seated on the top end of said shaft and locked therewith for rotational movement, filter tubes removably mounted in said openings, a used fluid inlet pipe concentrically positioned on said drive shaft and extending upwardly toward but not to the undersurface of said plate to enable spraying fluid against said plate, a central pipe shaft extending axially upwardly from the top surface of said plate through said outlet neck, an inner dome seated at the peripheral edge of said plate and having a central axial opening surrounding said pipe shaft, third fluid sealing means between said inner dome and the plate edge, and fourth fluid sealing means between said inner dome and said pipe shaft.

3. A cake-type filter apparatus comprising a fluid storage tank, a muck compressor mounted above said tank, and a fluid filtering tank mounted above said compressor, said fluid filtering tank having a cylindrical outer wall, an upper portion, and a cone depending therefrom having an axial thrust bearing at its bottom apex portion, an outer dome removably connected to the top of said wall and having a central outlet neck, first fluid seal means between said wall and dome, a drive shaft seated on said thrust bearing and extending from outside said cone axially upwardly through said bearing to the level of the upper portion of said wall, second fluid seal means between said drive shaft and said bearing, a filter tube means having a horizontal circular plate with openings and with a central depending socket seated on the top end of said shaft and locked therewith for rotational movement, filter tubes removably mounted in said openings, a central pipe shaft affixed to and extending axially upwardly from the top surface of said plate through said outlet neck, an inner dome seated at the peripheral edge of said plate and having a central axial opening surrounding said pipe shaft, third fluid seal means between said inner dome and the plate edge, fourth fluid seal means between said inner dome and said pipe shaft, clamping means adjustably movable along said pipe shaft into engagement with said fourth seal means to hold the inner dome in proper aligned position and produce fluid tight seals at the third and fourth seal means.

4. A cake-type filter apparatus in accordance with claim 1 and including a fluid storage tank and wherein said apparatus includes a horizontal cylinder, a valved conduit extending downwardly from the lower portion of said cone to the top of the wall of said cylinder, a piston in said cylinder, means for reciprocating said piston to compress muck, a door mounted at one end of said cylinder having an inside face opposed to the face of said piston, each face having a filter screen thereon to allow passage of reclaimed fluid, and conduit means in fluid communication with the downstream sides of said screens to conduct the reclaimed fluid to said fluid storage tank.

5. A cake-type filter apparatus in accordance with claim 3 and wherein each of said filter tubes includes parallel depending spaced pins, a helical spring surrounding said pins, and a tubular filter screen having a closed bottom end covering said helical spring and pins.

References Cited in the file of this patent

UNITED STATES PATENTS

| | | |
|---|---|---|
| 594,013 | Holthaus | Nov. 23, 1897 |
| 1,071,020 | Bartholomew | Aug. 26, 1913 |
| 1,110,283 | Beaston | Sept. 8, 1914 |
| 2,562,699 | Cooperson et al. | July 31, 1951 |
| 2,668,624 | Wahlin | Feb. 9, 1954 |
| 2,852,141 | Landon | Sept. 16, 1958 |